United States Patent [19]
Hussey et al.

[11] Patent Number: 6,019,902
[45] Date of Patent: Feb. 1, 2000

[54] FLUID RECOVERY SYSTEM

[75] Inventors: Frank Hussey, Novi; Robert Cox, Milford; Matthias Stegmueller, Northville; Dana Wregglesworth, Howell, all of Mich.

[73] Assignee: Durr Environmental, Inc., Plymouth, Mich.

[21] Appl. No.: 09/054,966

[22] Filed: Apr. 3, 1998

[51] Int. Cl.$^7$ .................................................. B01D 61/58
[52] U.S. Cl. .......................... 210/651; 210/774; 210/808; 210/500.25
[58] Field of Search .................................... 210/651, 774, 210/808, 500.25

[56] References Cited

U.S. PATENT DOCUMENTS

| | | | |
|---|---|---|---|
| 4,607,592 | 8/1986 | Richter | 118/689 |
| 4,956,093 | 9/1990 | Pirbazari et al. | 210/616 |
| 5,043,072 | 8/1991 | Hitotsuyanagi et al. | 210/638 |
| 5,051,188 | 9/1991 | Spiske et al. | 210/640 |
| 5,120,900 | 6/1992 | Chen et al. | 585/804 |
| 5,171,767 | 12/1992 | Buckley et al. | 210/651 |
| 5,207,917 | 5/1993 | Weaver | 210/651 |
| 5,336,413 | 8/1994 | van Staveren | 210/650 |
| 5,443,738 | 8/1995 | Bhatnagar et al. | 210/641 |
| 5,490,939 | 2/1996 | Gerigk et al. | 210/652 |
| 5,514,282 | 5/1996 | Hibbard et al. | 210/652 |
| 5,597,486 | 1/1997 | Lutz | 210/639 |

OTHER PUBLICATIONS

Pastick, et al. (1995) Alternate Process for Paint Sludge Handling. Automotive Body Painting, IBEC '95, pp. 64–72.

Krzesowski, (1991) In Advanced Coatings Technology, Proceeding of the ESD/ASM, Ann Arbor, MI, "Oil/water emulsion as an alternative".

Brochure, Introducing EPOC, A new era in paint booth management based on innovative recycling technology, (1992).

Brochure, Scepter, Stainless Steel Membrane Systems, Proven Technology For The Most Challenging Separations, (1996).

*Primary Examiner*—Robert J. Popovics
*Attorney, Agent, or Firm*—Howard & Howard

[57] ABSTRACT

A process for separating a carrier from a mixture of the carrier and paint solids includes collecting a mixture of the carrier and the paint solids and filtering the mixture through a metal or inorganic membrane filter whereby paint solids are retained by the filter and the carrier is allowed to pass through the filter.

11 Claims, 1 Drawing Sheet

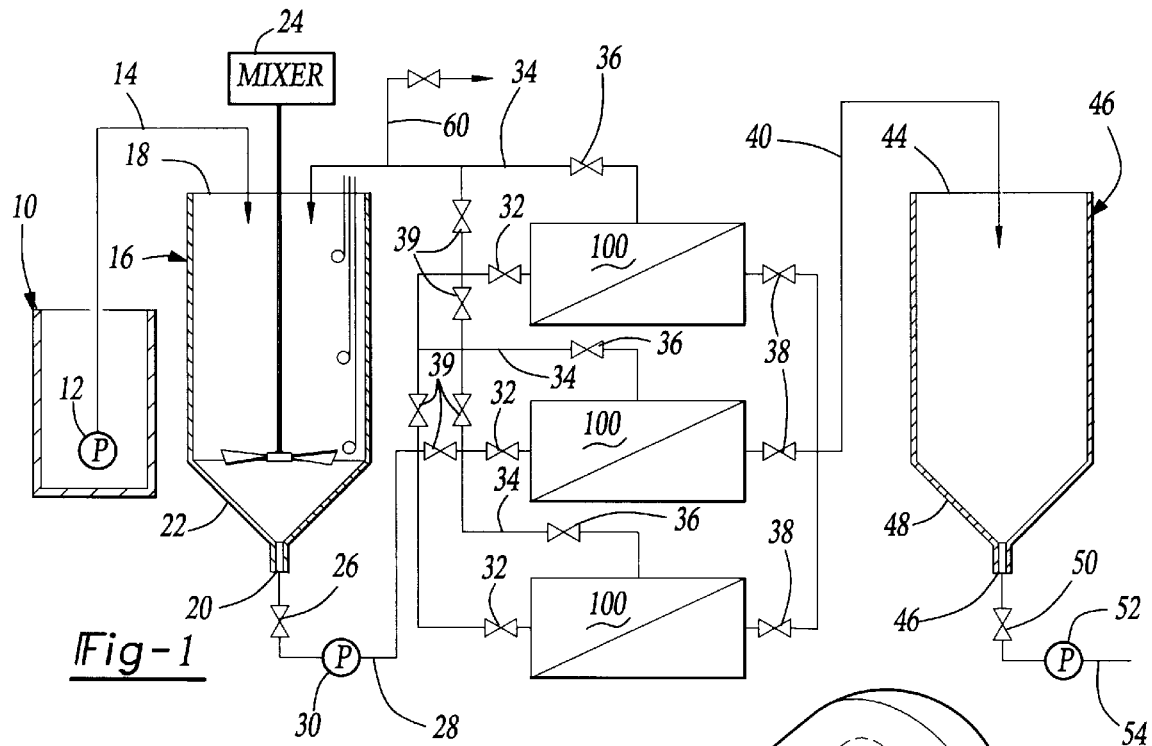
*Fig-1*
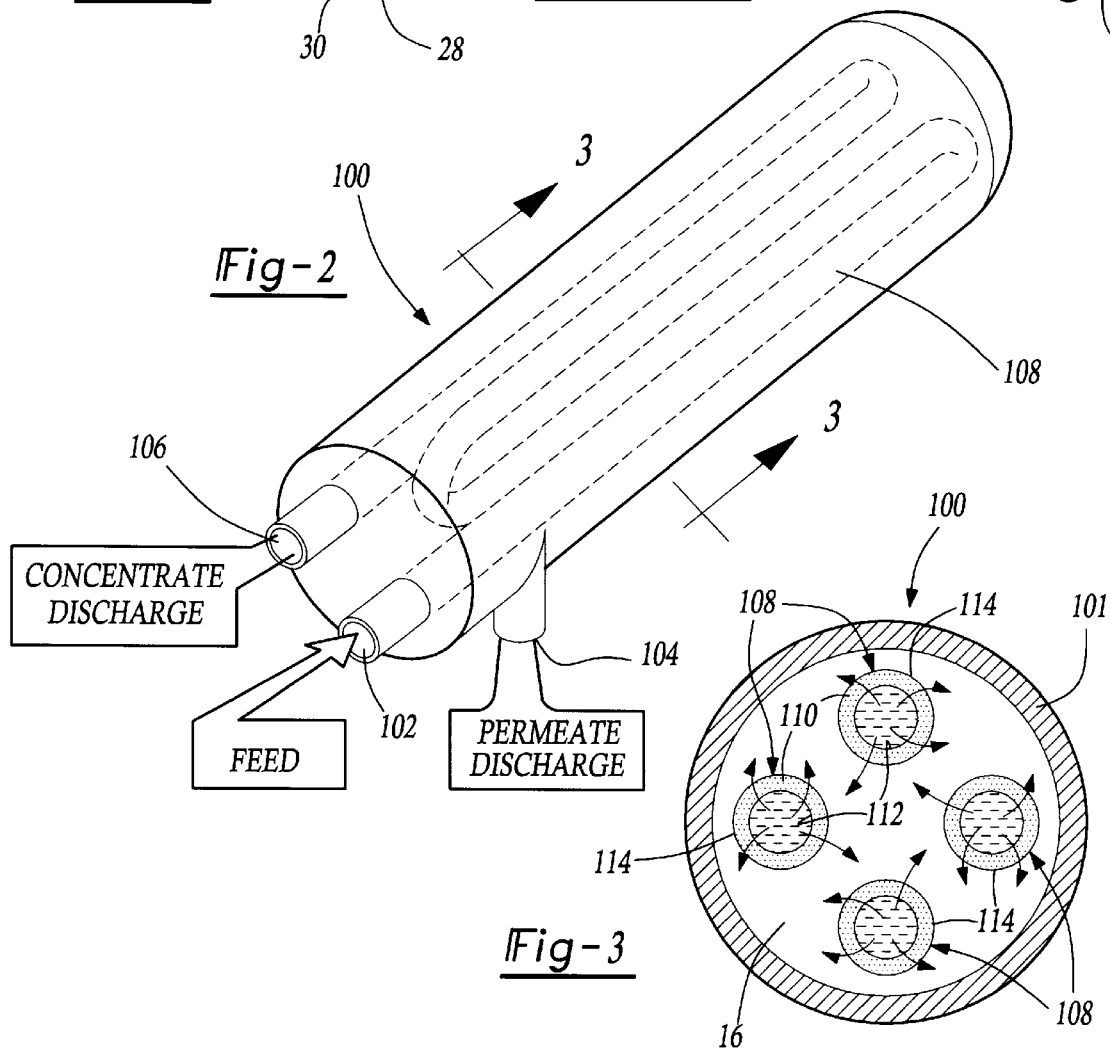
*Fig-2*
*Fig-3*

FLUID RECOVERY SYSTEM

TECHNICAL FIELD

The present invention relates to a process for separating a fluid used in denaturing paint overspray particles and, more specifically, to a process and apparatus for separating the fluid utilizing metal membrane filters.

BACKGROUND OF THE INVENTION

Paint is typically applied by spraying a mixture of paint solids and solvents onto a target such as an automobile. During this operation, some of the paint solids are not transferred to the target. Paint not reaching the target is referred to as overspray.

Because of increasing environmental concerns and regulations regarding the disposal of industrial waste products, several different methods have been developed aimed at reducing the volume of overspray generated in the course of painting an automobile. Additionally, processes have been developed which focus on recovery of the paint solids from both the overspray and from the cleaning of the spray equipment and the spray booth so that both the paint solids and the solvent can be reutilized in the coating process.

A common process for the recovery of paint solids from overspray utilizes a down-draft paint booth having an associated venturi scrubber and an eliminator section. Paint overspray continuously contacts a liquid circulating in the spray booth. Traditionally, the liquid is water. Then, high velocity filtered and conditioned air is supplied to the booth which exits the spray booth through a venturi scrubber. At the venturi scrubber, the high velocity air contacts the water for the purpose of scrubbing, i.e., removing the paint particulates. Then, the high velocity air enters an eliminator section which is typically disposed down stream of the scrubber section. The eliminator section includes a series of baffles which cause the disengagement of water droplets and paint solids that have become entrained in the air stream.

Paint overspray is typically recovered from water through chemical detackification. In the detackification process, chemicals such as organic polymers, clays, or silicas are added to the booth water, at a controlled pH, in order to detackify the paint, thus rendering the solids non-sticky. The chemical detackification process renders the overspray non-sticky or "detackified." By and large, the chemicals used in this method enhance the flotation of the paint solids through their coagulation and flocculation. Chemicals such as clays cause the paint solids to sink from the booth water where they could be collected as sludge. The sludge is allowed to settle in a retention tank and is then taken to a landfill for disposal and the solvent is removed.

Another method for the control of overspray and the recovery of solvents and paint solids therefrom replaces the water and chemical detackifying chemicals with an emulsion. The use of emulsion technology has eliminated the necessity for sludge dewatering as spent emulsion is taken off-site for treatment and disposal.

In a typical emulsion system, the circulating booth liquid is an emulsion containing approximately thirty percent by weight naphthenic oil and approximately seventy percent by weight water. Paint overspray solids are continuously contacted with the emulsion. The concentration of suspended solids in the emulsion can nominally be maintained in the range of five to ten percent by weight of solids. In order to maintain this concentration, a portion of the emulsion laden with paint solids, "spent emulsion," is removed from the system and is taken to an off-site facility where it is processed. At the off-site facility, the emulsion is chemically broken or cracked by the addition of sulfuric acid to form a sludge phase, an oil or solvent phase, and a water phase which are subsequently fractionated for recovery and/or disposal. This is an effective method for the recovery of paint solids from overspray; however, the use of off-site recovery of the spent emulsion involves increased costs due to the on-site storage and the transportation of the spent emulsion to an off-site processing plant.

Accordingly, it would be desirable and advantageous to have a process for recovering spent emulsion on-site, at the point where it is generated, in order to eliminate the costs associated with the prior art methods of overspray management and fluid recovery.

SUMMARY OF THE INVENTION

The present invention relates to a metal or inorganic membrane filtration process for recovery of overspray from the spray application of paint. The process includes collecting a mixture of a carrier and paint solids and then filtering the mixture through a metal or inorganic membrane filter assembly whereby the paint solids are retained by the filter assembly and the carrier is allowed to pass therethrough for reuse.

Also disclosed is a system for separating a carrier from a mixture of a carrier and paint solids collected from a spray booth which includes a storage vessel for receiving and retaining the mixture of carrier and paint solids from the spray booth, at least one metal membrane filter disposed in fluid communication with the storage vessel whereby the filter retains the paint solids while allowing the carrier to pass therethrough, and a collection vessel disposed in fluid communication with the metal membrane filter to receive the carrier discharged from the filter assembly.

Accordingly, the subject invention provides a process for the on-site recovery of fluids utilized in the overspray recovery process. In addition, the process provides a more cost effective means for fluid recovery from an overspray recovery system by eliminating the necessity for on-site storage of spent fluids and their subsequent transportation to an off-site facility for processing.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a flowchart illustrating an embodiment of the process and system according to the present invention;

FIG. 2 is a perspective view of metal membrane filter assembly according to the present invention; and FIG. 3 is a cross-sectional view of the metal membrane filter assembly taken along line 3—3 of FIG. 2.

DETAILED DESCRIPTION OF THE INVENTION

Referring to FIG. 1, the general process for the separation of a carrier from a mixture of a carrier and paint solids collected from a spray booth (not shown) is illustrated. The carrier is an emulsion or dispersion of a solvent or oil and water which is described in detail hereinbelow. Overspray of paint particles contact the carrier and form a mixture which is collected in a collection vessel 10. The carrier and paint solids ("spent dispersion") are then pumped via a pump 12 through a conduit 14 represented by the line and arrow into a concentrating vessel 16 having an inlet 18 and an outlet 20. The concentrating vessel 16 is preferably constructed of a chemical and corrosion resistant material such as stainless steel. The concentrating vessel 16 can have a conically shaped end 22 which is disposed directly above the outlet 20. This conically shaped end 22 allows for the concentration and settling of paint particles from the "spent dispersion." A mixer 24 can be disposed within the concentrating vessel 16 for agitating or stirring the "spent dispersion" and paint solids. The "spent dispersion" is discharged from the concentrating vessel via the outlet 20. A control valve 26 controls the discharge of the "spent dispersion" from the concentrating vessel 16. A conduit 28, preferably constructed of a material resistant to chemical and to corrosive attack, is disposed in fluid communication with the outlet 20 and valve 26. The conduit 28 is also in fluid communication with a pump 30 which pumps the "spent dispersion" for distribution to the filter assemblies 100.

Prior to filtration, the "spent dispersion" is directed into selected filtration assemblies 100 by the utilization of inlet valves 32 which control the flow of "spent dispersion" into the filter assemblies 100. Return lines or conduits 34 connected to the filter assemblies 100 are connected to valves 36 which allow for concentrate discharge from the filter assemblies 100 to be recirculated back to the concentrating vessel 16.

After the "spent dispersion" has been separated into a solid component (paint solids) and liquid component (permeate) the permeate or filtered carrier exits the filter assembly 100 through valves 38 and is transported through a conduit 40 to a permeate collection vessel 42 which has an inlet 44 and an outlet 46. The permeate collection vessel 42 also includes a conical end 48 which directs the permeate contained therein to the outlet 46. An outlet valve 50 controls the flow of permeate from the permeate collection vessel 42. Permeate exiting the permeate collection vessel 42 can then be pumped via pump 52 through a conduit 54 to appropriate storage facilities for later use.

Referring to FIGS. 2 and 3, the filter assembly 28 preferably includes at least one filter assembly 100 which includes a metal or inorganic membrane filter 108 disposed therein. A preferred metal membrane filter assembly 100 is the SCEPTER™ Stainless Steel Filter Assembly (Graver Separations, Glasgow, Del.). The metal membrane filter 108 is preferably constructed of a corrosion and chemical resistant metal and/or alloys thereof. Preferably, the metal membrane filter 100 is constructed of stainless steel. In a preferred embodiment, the stainless steel filter assembly includes a coating of titanium disposed on its inner surface to provide pores of less than 1.0 $\mu$m in size. The metal membrane filter 108 can also be constructed of materials such as titanium, and alloys such as HASTELOY, MONEL, and INCONEL and NICROFER (Krups, Germany) which are all well known chemical and corrosion resistant nickel alloy materials. Other organic materials which can be used as membrane filters can be constructed of materials capable of withstanding the prescribed environment including the high temperatures and pressures utilized in the present system and can include, for example, carbon; carbon nitride; tungsten nitride; aluminum oxide; aluminosilicates; silicon carbide; ceramic materials; metalloids such as boron, silicon, germanium; metal membranes with pore sizes greater than 1.0 $\mu$m having disposed on its inner surface an inorganic coating having sub-micron sized pores. The metal membrane filter 108 has a pore size which is capable of sub-micron filtration. The preferred cut-off pore size is a pore size of less than about 1.0 $\mu$m. The nominal pore size of the metal membrane filter 108 is between about 0.01 $\mu$m to about 1.0 $\mu$m. A more preferred range for the pore size of the filter 108 is between about 0.05 $\mu$m to about 0.5 $\mu$m. A preferred nominal pore size for the metal membrane filter 108 is about 0.1 $\mu$m. Because of the size of the paint solid particles (filtrate), the metal membrane filter 108 must be selected such that it is capable of sub-micron filtration. Suitable pore size depends on the size of the particles being filtered and one skilled in the art would recognize that the pore size may need to be adjusted or specifically selected to retain various filtrates.

The filter assembly 100 includes a housing 101 disposed about the filter membrane tubes 108. The housing 101 encloses the filter membrane tubes 108 and includes a feed inlet 102, a permeate discharge outlet 104, and a concentrate discharge outlet 106. The ends of the filter membrane tubes 108 are in fluid communication with the feed inlet 102 and the concentrate discharge outlet 106.

In operation, "spent dispersion" enters the filter assembly 100 through the feed inlet 102 where it enters the metal membrane filter tube 108. The "spent dispersion" transported through the interior 112 of the metal membrane filter tube 108. The "spent dispersion" passes through walls 110 of the metal membrane filter tube 108 where it is collected and discharged through the permeate discharge outlet 104.

Due to the hostile and corrosive nature of the chemicals flowing through the system, all of the conduits and collection vessels are made of a corrosion resistant material, preferably stainless steel. Additionally, all joints between the conduits and the vessels, the valves, etc. are preferably welded to eliminate the use of elastomeric, i.e. rubber, seals. Also, because the system is operated at high temperatures and pressurizes, welded joints and/or fittings are preferred. Additionally, components of the system can be coated with or constructed of a fluoropolymer such as TEFLON.

As is shown in FIG. 3, the permeate, represented by the black arrows, passes through the walls 110 of the metal membrane filter tube 108 into a collection space 116 which is disposed in fluid communication with the permeate discharge outlet 104.

The "spent dispersion" can be heated to a temperature range of between about 100° F. to about 200° F. prior to its filtration. The heating of the "spent dispersion" can be accomplished by means well known in the art such as disposing at least one heat exchanger in fluid communication with the stream of "spent dispersion" prior to its entry into the filter assemblies 100. Heating the "spent dispersion" can lower the viscosity of the "spent dispersion" depending on the carrier selected and thus provides greater filtering efficiency. Preferably, the stream of "spent dispersion" is heated to a temperature range of between about 160° F. to about 180° F.

Additionally, the stream of "spent dispersion" can be pressurized prior to its entry into the filtration assembly 100. The stream of "spent dispersion" can be pressurized to a range of between about 200 lbs/in$^2$ to about 1000 lbs/in$^2$. Preferably, the stream of "spent dispersion" is pressurized to a range of between about 400 lbs/in$^2$ to about 700 lbs/in$^2$. Most preferably, the stream of "spent dispersion" is pressurized to a range of between about 550 lbs/in$^2$ to about 650 lbs/in$^2$. The pressurization of the stream of "spent dispersion" also increases the efficiency of the separation of the "spent dispersion" into and paint solids and carrier.

The process can also include concentrating the "spent dispersion" prior to the filtering operation. That is, the "spent dispersion" can be allowed to settle or concentrate in the collection vessel 16 and/or fluid can be drawn off from the "spent dispersion" disposed in the collection vessel 16 to increase the relative concentration of paint solids in the "spent dispersion" prior to the filtering operation.

The carrier dispersion generally comprises a solvent and water. Preferably comprises a naphthalenic oil or water insoluble solvent having a boiling point greater than approximately 200° C. Preferably the water insoluble solvent is an ester. More preferably, the ester is a diester which is resistant to hydrolysis in water. The most preferred solvents are isobutyl esters of diols, triols, and polyols. Suitable diesters include diisobutyl glutarate, diisobutyl succinate, diisobutyl adipate, acetate esters, phthalate esters, and mixtures thereof. A preferred diester carrier which can be utilized with the subject invention is Booth Control 3001, (PPG, Troy, Mich.). See Table 1 for a more comprehensive list of suitable carriers.

Emulsions of a diisobutyl ester of a diol (Kodaflex B or TXIB) and water (NORTRU Paint Services Group, Detroit, Mich.), described above, can also be used in this system.

The system according to the present invention can be operated in two modes:

1. a batch mode wherein the permeate is removed from the system while the concentrate discharge is recycled back to the collection vessel 16 until the desired concentration is achieved, or
2. a continuous system wherein "spent dispersion" is fed to the system and permeate and concentrate are discharged from the system at steady-state conditions (i.e., the paint solids content of the concentrate remains is essentially constant).

While three filter assemblies 100 are shown, any number of filtration assemblies 100 can be utilized in the system. For example, as shown in FIG. 1, three filter assemblies 100 are connected in parallel with each other. At any one time, one or more filtration assemblies 100 may be used with other assemblies not being used. By arranging the system with more than one filter assembly 100 in parallel, it allows for at least one filter assembly 100 to be inoperative so that it may be cleaned while the system remains in operation with the remaining filter assembly or assemblies 100. Additionally, valves 39 can be controlled so as to allow for the filter assemblies 100 to be used in parallel, in series, or both.

The filter assembly 100 can be cleaned or washed by reversing the direction of the system or "backwashing" the system by forcing a solution through the wall 110 of the filter tube 108 from the exterior 114 of the tube 108 to the interior 112 of the tube 108 thereby flushing the particulate matter composed mainly of paint solids, through the metal membrane filter tube 108 where it can be removed from the filter assembly 100 via a concentrate bleed or discharge conduit 60.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, where reference numerals are merely for convenience and are not to be in any way limiting, the invention may be practiced, otherwise than as specifically described.

TABLE 1

CARRIERS

| Type | Composition | Tradename and Manufacturer/Distributor |
|---|---|---|
| acetate ester | ($C_6$ alkyl acetate) | EXXATE 600, Exxon Chemical Company, Houston, Texas |
| acetate ester | ($C_7$ alkyl acetate) | EXXATE 700 Exxon Chemical Company, Houston, Texas |
| acetate ester | ($C_8$ alkyl acetate) | EXXATE 800 Exxon Chemical Company, Houston, Texas |
| acetate ester | ($C_9$ alkyl acetate) | EXXATE 900 Exxon Chemical Company, Houston, Texas |
| acetate ester | ($C_{10}$ alkyl acetate) | EXXATE 1000 Exxon Chemical Company, Houston, Texas |
| acetate ester | ($C_{13}$ alkyl acetate) | EXXATE 1300 Exxon Chemical Company, Houston, Texas |
| phthalate ester | diisononyl phthalate | JAYFLEX DINP Exxon Chemical Company, Houston, Texas |
| phthalate ester | diisononyl phthalate | JAYFLEX DINP Exxon Chemical Company, Houston, Texas |
| cellulose ester | | KODAFLEX TXIB Eastman Chemical Co, Kingsport, Tennessee |
| phthalate ester | undecyl dodecyl phthalate | JAYFLEX UDP Exxon Chemical Company, Houston, Texas |
| phthalate ester | ditridecyl phthalate | JAYFLEX DTDP Exxon Chemical Company, Houston, Texas |
| other | trioctyl trimellitate | JAYFLEX TOTM Exxon Chemical Company, Houston, Texas |
| other | triisononyl trimellitate | JAYFLEX TINTM Exxon Chemical Company, Houston, Texas |
| other | secondary plasticizer | JAYFLEX 210 Exxon Chemical Company, Houston, Texas |
| other | secondary plasticizer | JAYFLEX 215 Exxon Chemical Company, Houston, Texas |
| ester alcohol | | TEXANOL Ester-Alcohol Eastman Chemical Co., Kingsport, Tennessee |
| glycol ether DB acetate | | Dow Chemical Co., Midland, Michigan |
| diisobutyl esters of glutaric, succinic and adipic acids | diisobutyl esters | BC3001 PPG, Inc., Troy, Michigan |
| diisobutyl esters of pimelic, azelaic, sebacic, and phthalic acids | diisobutyl esters | |

What is claimed is:

1. A method of separating and removing paint solids collected in a paint application system and recirculating the liquid carrier to said paint application system, said method comprising:

collecting said paint solids in a mixture of water and an organic carrier having a boiling point greater than 200° C.;

concentrating said mixture and recirculating a portion of said water and organic carrier to said paint application system;

heating said concentrated mixture of paint solids, water and organic carrier to a temperature of 100° F. or greater;

filtering said heated concentrated mixture of paint solids, water and organic carrier through an inorganic membrane filter having a nominal pore size smaller than the particle size of said paint solids; and returning the permeate mixture of water and organic carrier to said paint application system and removing said paint solids.

2. The method of separating and removing paint solids collected in a paint application system and recirculating the liquid carrier as defined in claim 1, wherein said method includes pressurizing said concentrated mixture of paint solids, water and organic mixture to a pressure of greater than 100 lbs. per square inch before filtering.

3. The method of separating and removing paint solids collected in a paint application system and recirculating the liquid carrier as defined in claim 1, wherein said method includes pressurizing said concentrated mixture of paint solids, water and organic carrier prior to filtering to a pressure of between 100 lbs. per square inch and 1,000 lbs. per square inch.

4. The method of separating and removing paint solids collected in a paint application system and recirculating the liquid carrier as defined in claim 1, wherein said method includes heating said concentrated mixture of paint solids, water and organic carrier to a temperature of between about 160° F. to about 180° F. before filtering.

5. The method of separating and removing paint solids collected in a paint application system and recirculating the liquid carrier as defined in claim 1, wherein said method includes collecting said paint solids in a mixture of water and an organic water insoluble carrier including an ester.

6. The method of separating and removing paint solids collected in a paint application system and recirculating the liquid carrier as defined in claim 1, wherein said method includes filtering said mixture of paint solids, water and organic carrier through a metal membrane filter having a pore size of between about 0.05 micrometers to about 0.5 micrometers.

7. A method of separating and removing paint solids collected in a paint application system and recirculating the liquid carrier to said paint application system, said method comprising the following steps:

collecting said paint solids in a mixture of water and an organic carrier having a boiling point greater than 200° C.;

heating said mixture of paint solids, water and organic carrier to a temperature of 100° F. or greater;

pressurizing said heated mixture of paint solids, water and organic carrier to a pressure of 100 lbs. per square inch or greater;

filtering said heated pressurized mixture of paint solids, water and organic carrier through an inorganic membrane filter having a nominal pore size less than the particle size of said paint solids; and returning the permeate mixture of water and organic carrier to said paint application system and removing said paint solids.

8. The method of separating and removing paint solids collected in a paint application system and recirculating the liquid carrier as defined in claim 7, wherein said method includes concentrating said mixture of paint solids, water and organic carrier prior to filtering and returning a portion of said water and organic carrier to said paint application system.

9. The method of separating and removing paint solids collected in a paint application system and recirculating the liquid carrier as defined in claim 7, wherein said method includes heating said mixture of paint solids, water and organic carrier to a temperature of about 160° F. to about 180° F.

10. The method of separating and removing paint solids collected in a paint application system and recirculating the liquid carrier as defined in claim 7, wherein said method includes pressurizing said mixture of paint solids, water and organic carrier to a pressure greater than 200 lbs. per square inch.

11. The method of separating and removing paint solids collected in a paint application system and recirculating the liquid carrier as defined in claim 7, wherein said method includes filtering said mixture of paint solids, water and organic carrier through a metal membrane filter having a pore size of between about 0.05 micrometers to about 0.5 micrometers.

* * * * *